INVENTORS
LOUIS A. OLLIVIER
& JAMES B. SKITT, Jr.

INVENTORS
LOUIS A. OLLIVIER &
JAMES B. SKITT, Jr.
BY

ATTORNEYS

May 31, 1966  L. A. OLLIVIER ETAL  3,253,467
PRESSURE TO CURRENT TRANSDUCER
Filed Oct. 9, 1963  5 Sheets-Sheet 3

INVENTORS
LOUIS A. OLLIVIER &
JAMES B. SKITT, Jr.

BY

ATTORNEYS

May 31, 1966  L. A. OLLIVIER ETAL  3,253,467
PRESSURE TO CURRENT TRANSDUCER
Filed Oct. 9, 1963  5 Sheets-Sheet 5

INVENTORS
LOUIS A. OLLIVIER &
BY JAMES B. SKITT, Jr.

ATTORNEYS

United States Patent Office 3,253,467
Patented May 31, 1966

3,253,467
PRESSURE TO CURRENT TRANSDUCER
Louis A. Ollivier, Huntingdon Valley, and James B. Skitt, Jr., Chalfont, Pa., assignors to Fischer & Porter Company, Warminster, Pa., a corporation of Pennsylvania
Filed Oct. 9, 1963, Ser. No. 314,965
6 Claims. (Cl. 73—398)

This invention relates to a pressure to current transducer providing a current output proportional to pressure.

In accordance with the invention a transducer of this type is provided involving a force balance system of a null type to secure high linearity. For balance a current is fed to a coil in a d'Arsonval system to provide a force accurately proportional to the current. This current is then measured. A sensitive null detector is provided involving change of inductance of a winding on a core by reason of the position of an armature. The instrument provides adjustments for range and for zero. A high degree of insensitivity to temperature changes is involved.

Desirably, the electrical transmission involved should be as simple as possible and particularly, irrespective of the remoteness of a reading device from the point of measurement, the signals for a particular pressure should be the same. Desirably, also, the number of connections should be minimized, and high linearity maintained throughout the measuring ranges. These ends are achieved in accordance with the invention.

A further object of the invention is the provision of a system which, by simple substitution of assemblies, may be used for the measurement of widely varying pressure ranges.

The foregoing and other objects of the invention will become more apparent from the following description, read in conjunction with the accompanying drawings, in which.

Figure 1:
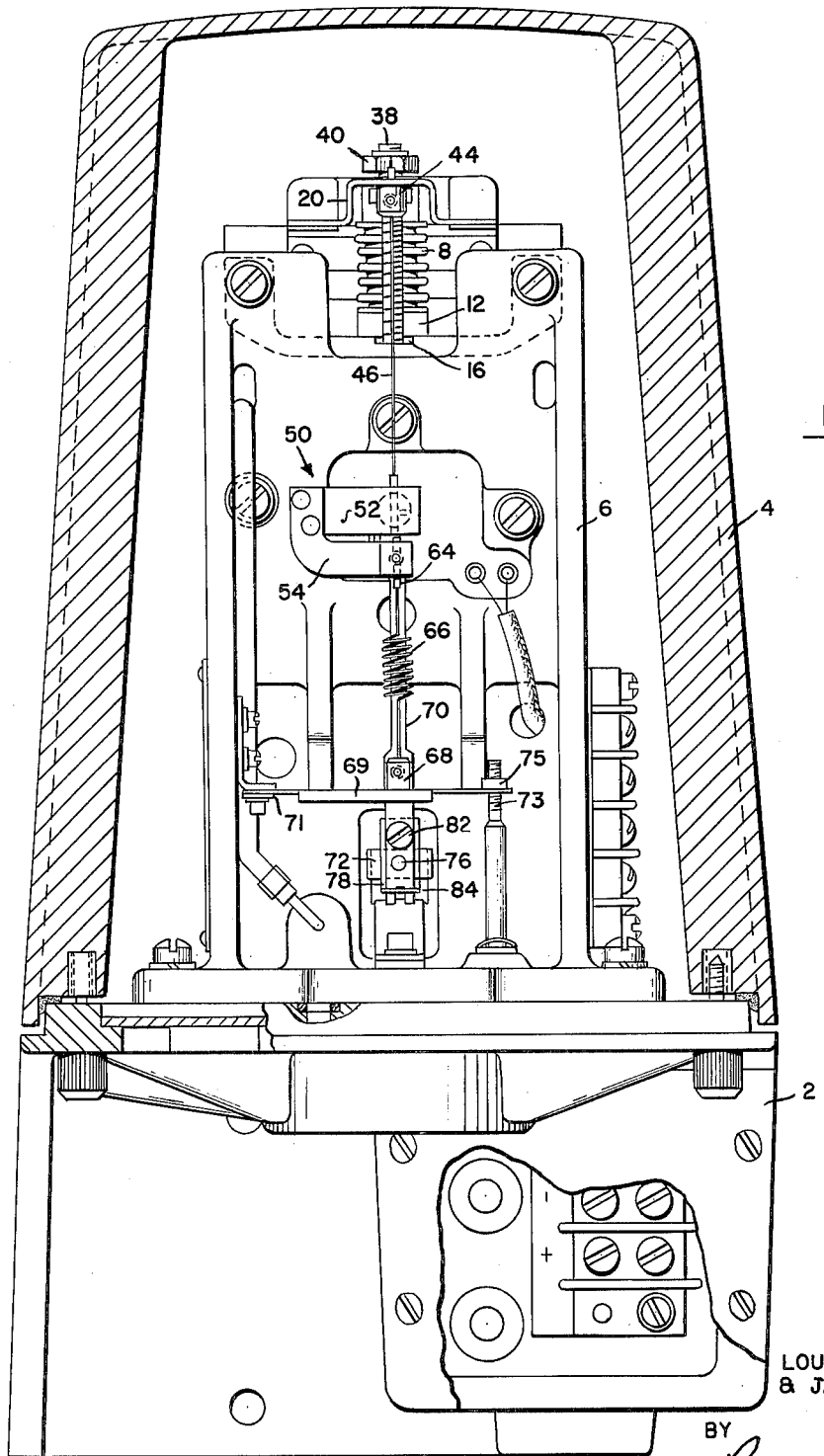
FIGURE 1 is an elevation, with a cover shown in section, of one embodiment of the invention particularly usable for the measurement of relatively low pressures.
Figure 2:
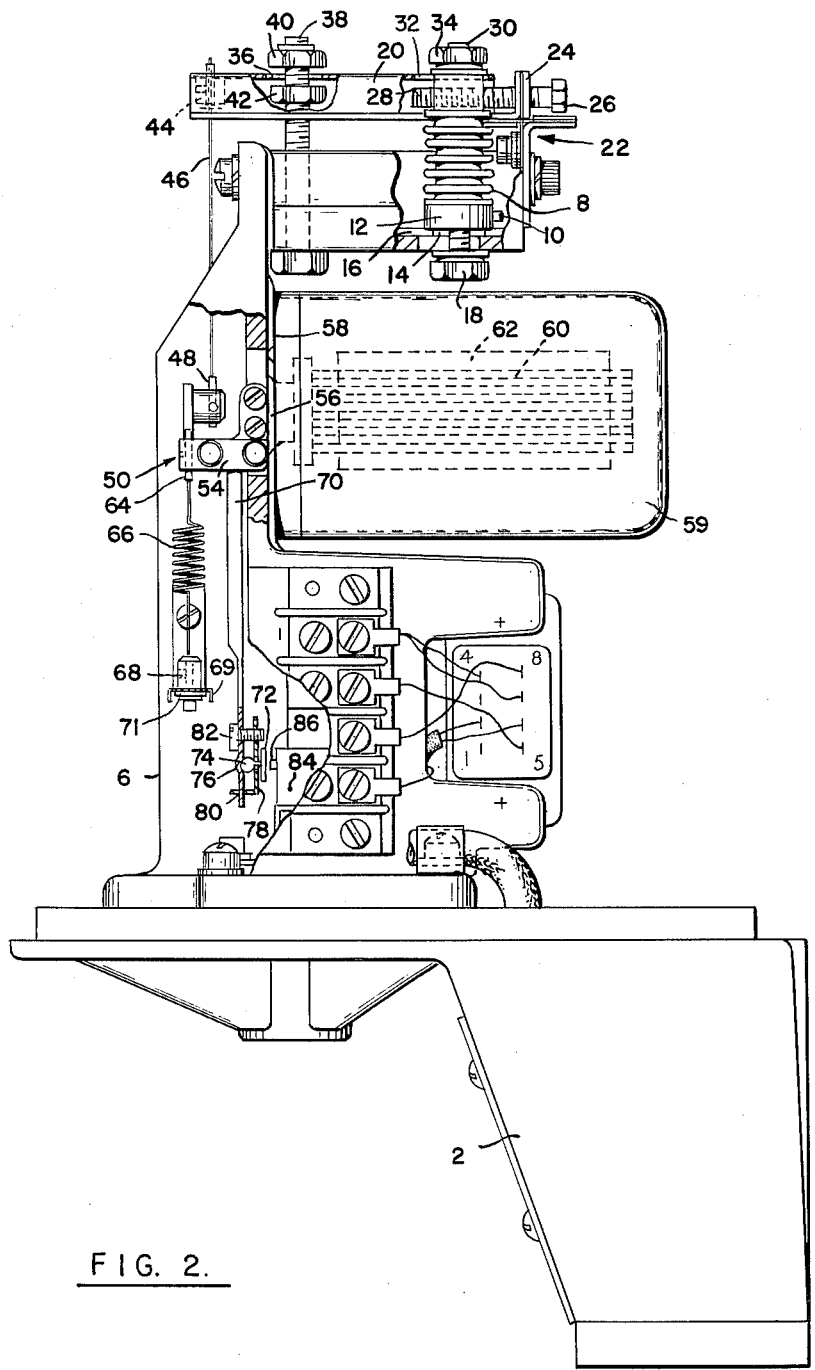
FIGURE 2 is an elevation, partly in section, looking at the right-hand side of the elements shown in FIGURE 1.
Figure 3:
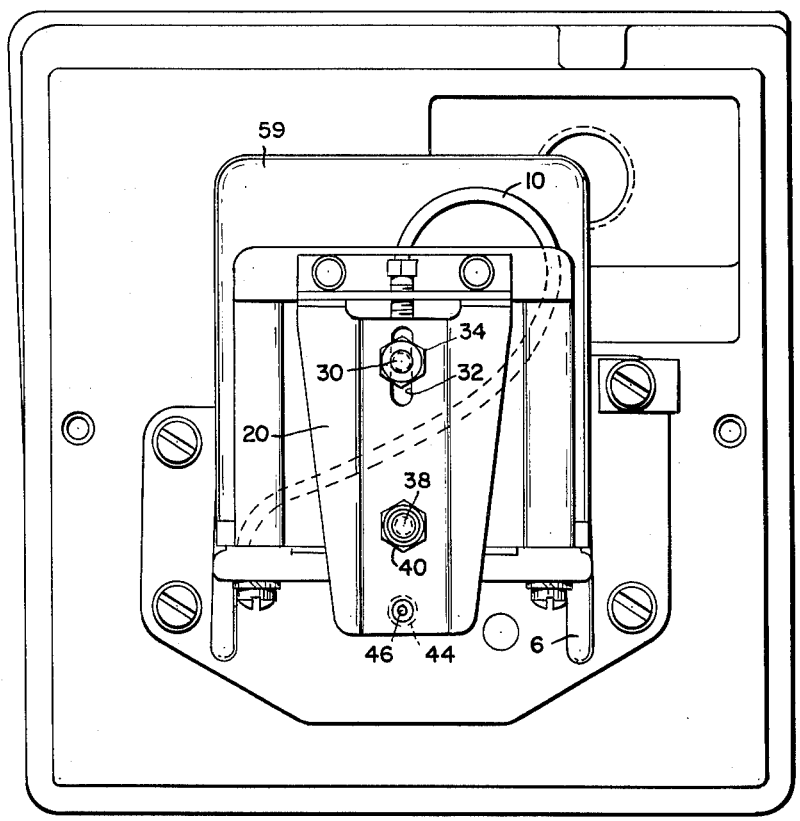
FIGURE 3 is a plan view of the same.

Referring first to FIGURES 1, 2 and 3, a base 2 of any suitable form mounts a removable cover 4 and the frame 6 which carries the mechanical parts of the apparatus. This frame 6 is made up of parts the nature of which will be readily understood from the drawings.

A bellows 8 is subjected to the pressure to be measured through a tube connection indicated at 10 to its base 12. This base is provided with a tongue 14 which is arrranged to slide in a groove 16 in a transverse member of the frame. This member is also slotted to permit movement of the shank of a screw 18 adapted to clamp the base 12 in fixed position.

A lever 20 has a pivot provided by a conventional cross-flexure arrangement indicated at 22. This flexure includes an upwardly extending flange 24 of the lever and a screw 26 is threaded in this flange and in the top 28 of the bellows which is formed as a block. To provide for fine adjustment, the screw 26 is of differential type, the threads in the flange 24 and in the block 28 having different pitch. The block 28 is provided with a threaded stud 30 passing through a slot 32 in the lever 20 and arranged to receive the nut 34 adapter to clamp the block in fixed position after adjustment. If the screw 18 and the nut 34 are freed, rotation of the screw 26 provides a fine lateral adjustment of the bellows assembly along the lever 20 and the cross-member of the frame, sliding taking place within the groove 16. This lateral adjustment is thus effected without imparting bend transverse to the axis of the bellows, the bellows assembly moving as a unit. When the final adjustment is secured for the range desired, the screw 18 and nut 34 may be tightened to fit the adjustment made. As will appear later, the angular movements of the lever 20 are minute during operation and the operation is of a null type so that movement of the block 28 is essentially at all times in the direction of the axis of the bellows.

To avoid damage stops are provided limiting the movement of the lever 20, and for this purpose a screw 38 secured in the frame passes through a clearance opening 36 in the lever 20 and carries adjustable nuts 40 and 42 to limit lever movements. The adjustment may be such that the lever movements are quite small.

Anchored at 44 to the free end of the lever 20 is a wire link 46 the lower end of which is connected at 48 to an arm 52 of a lever generally indicated at 50 and comprising a second arm 54. The arm 52 is made of a strip of bimetallic metal so that the connection at 48 may move with temperature changes relative to the effective pivot of the lever 50 to compensate for such changes by changing the lever arm for the application of forces transmitted through the link 46. The lever 50 is effectively integral with a coil 60 in the motor 59, the coil 60 being rectangular in form and moving in gaps in a magnetized core 62. The pivot for the coil and lever 50 is provided by the flexible diaphragm 58 which closes the oil-filled interior of the motor.

The arrangement of the coil with respect to the core, the latter of which provides a uniform field, is such that the torque exerted is proportional to the current through the coil. In operation the movement of the coil is very slight in view of the null-type of detection involved.

Connected to the lever 50 at 64 is the upper end of a spring 66, the lower end of which is anchored at 68 to a spring lever 69 provided with a flexure type pivot at 71. The position of the free end of this lever is adjustable by manipulation of a nut 75 overlying the lever and threaded on a fixed screw 73 which passes through an opening in the lever end. By adjustment of this nut a zero adjustment for the apparatus is provided.

The lever 50 has secured therein a rod 70 providing a long arm extension on which is adjustably mounted a ferrite armature 72, the adjustable mounting comprising a socket 76 in the rod 72 receiving a ball 74 secured to the ferrite armature and arranged to be clamped in a definite position by an arm 78 having a pivotal connection at 80 to the rod 70 and adapted to be tightened on the ball by a screw 82 passing through an opening in the rod 70 and threaded into the lever 78.

The armature 72 is arranged to move, with movements of the rod 70, relative and closely adjacent to the ends of a ferrite core 86 carrying a winding 88 and embodied in a non-magnetic insulating block 84 fixed to the frame. The movement of the armature varies the inductance of the winding 88. A fine zeroizing adjustment is provided by the tilting of the armature 72 in the socket 76 with fixation in adjusted position.

Figure 4:
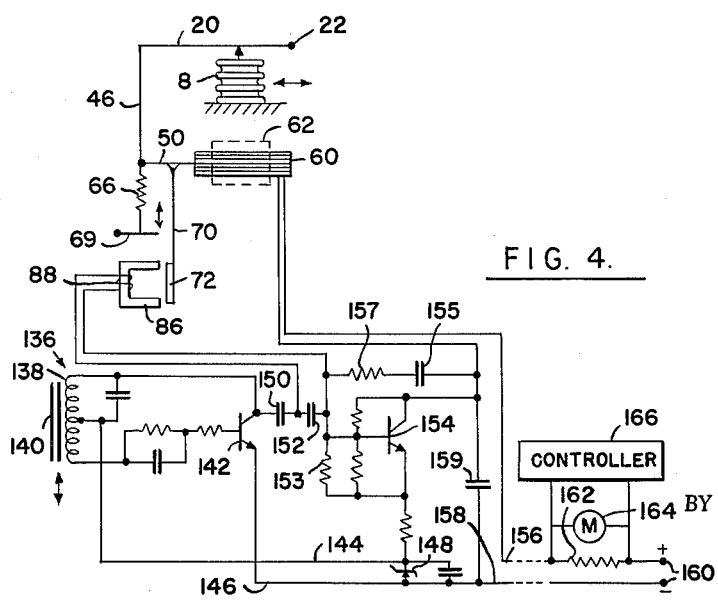
FIGURE 4 is a schematic diagram particularly indicating the electrical elements of the transmitter, mechanical elements also being diagrammed.

The electrical circuitry may be explained with particular reference to FIGURE 4 which also diagrams the mechanical aspects of the apparatus which have already been described in detail.

A transistor oscillator is provided at 136 which operates at constant amplitude and frequency, the frequency being adjustable. This oscillator comprises a conventional circuit including coil 138 wound on an adjustable ferrite core 140, the adjustment of the latter providing for setting of frequency of the oscillator. The transistor involved in this oscillator is indicated at 142. For the purpose of securing high stability and constancy of operation the oscillator is powered through the leads 144 and 146 connected across a Zener diode 148 which maintains a constant supply voltage.

The output from the collector of the transistor is delivered through capacitor 150 to a parallel resonant network which consists of the winding 88 and fixed capacitor 152 together with incidental distributed capacities. While this resonant network might be tuned to resonance near a predetermined frequency of the oscillator, it is more convenient to provide adjustment of the oscillator frequency with respect to the resonant frequency of the fixed network by adjustment of the core 140. The particular frequency used is not critical, but a frequency of about 100 kilocycles per second has been found very suitable.

The output of the resonant circuit is fed to the base of a transistor 154 which is biased in usual fashion through resistors for class C operation providing a direct component of current through the collector due to this operation which is a function of the excitation of the base, the alternating component of the collector current being bypassed by capacitor 159. The resistor illustrated at 153 is desirably a thermistor to provide temperature compensation and may be chosen to suit the other components to provide this compensation. A feedback network comprising the capacitor 155 and resistor 157 is provided between the transistor collector and its base for the purpose of damping oscillations.

The collector of transistor 154 is connected to one terminal of the coil 60 which receives the direct component of its current. From the other terminal of this coil and from the line 146 previously mentioned there runs the transmission line comprising the conductors 156 and 158, the dotted lines here indicating the possibility of a long two-wire transmission line which may join the parts of the apparatus already described to those which follow.

At the ends of the lines 156 and 158 connections are made to direct current supply terminals 160 providing voltage and current suitable for the operation of the transistors used. In one of the lines, in series with the supply terminals, there is indicated a load resistor 162 from the ends of which the output is taken as to a meter 164, which may be of indicating or recording type, and/or a controller indicated at 166. The load resistance which is indicated separately at 162 may, of course, by internal to either 164 or 166. The controller 166 which is used may be of any suitable type and need not be detailed. It may be used to effect control of the process variable which gives rise to the pressure undergoing measurement.

The overall operation is as follows:

The output of the oscillator, which, as described, has a fixed frequency and amplitude, controls the input to the amplifier involving the transistor 154 through the parallel circuit of coil 88 and capacitor 152. The action is dependent upon the variation of inductance of this coil as the gap of its core 86 is to a greater or less extent bridged by the ferrite armature 72. In a typical arrangement a relative movement between the core and armature of only 0.001 inch will produce a full scale change in the current through the coil 60. This sensitivity is such that from a practical standpoint the position of the armature is essentially fixed and fixes the positions of all of the mechanical parts of the system. Any deviation of the mechanical parts from a balanced position will result through the linkage already described in movement of the armature which, controlling current through the coil 60, will restore the force balance. Since the torque exerted on the coil 60 is linearly proportional to the current therethrough and the force required for balance is directly proportional to the pressure in the bellows 8, it will be evident that when the balance is automatically restored the current through the coil will be a direct linear measure of the pressure. Connections are, of course, made so that the restoration of balance is effected as described. From the electrical standpoint operation is adjusted to one side of, but close to, the resonant peak of the circuit 88, 152, by adjustment of the frequency of the oscillator by the core 140.

As will be evident from the series connection, the current through the coil 60 is directly measured by the meter 164 and/or the controller 166. Since the oscillator operates at a fixed frequency and amplitude, its operation does not variably affect the current through the resistor 162, and the spacing between the core of winding 88 and the armature element 72 is maintained very nearly constant.

It will be evident that since the measurement is made in terms of a variable direct current the length of the two-wire transmission line 156, 158 is quite immaterial. Only two conductors, furthermore, are involved both for supplying power to the apparatus from the terminals 160 and for measurement. The transistor 142 operates at a lower power level than the transistor 154 so that the Zener diode 148 in the emitter circuit of the latter may properly maintain substantially constant operation of the oscillator. Even if small variations in current taken by the oscillator did exist, that would not affect the operation, since that depends on the current through the coil 60 which is directly measured.

Because of the fact that moving parts are automatically restored to a null position with only minute deviations therefrom when the input pressure changes, it will be evident that the spring 66 enters into the operation purely as a null adjustment, thereafter during operation applying a substantially constant torque to the mechanical lever system.

The range adjustment provided by the differential screw 26 is simple, involving merely a change of the lever arm as will be evident.

Figure 5:
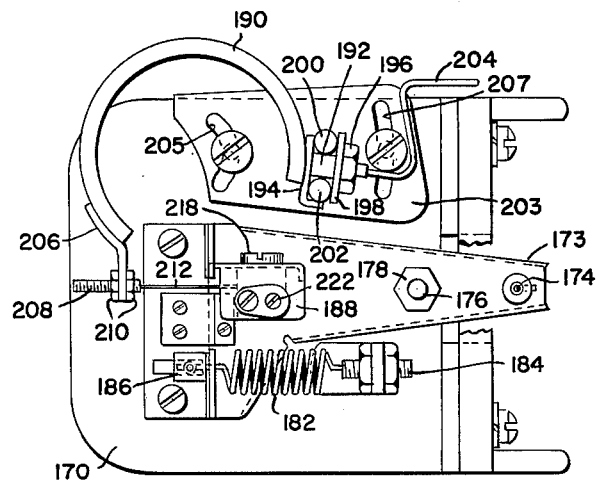
FIGURE 5 is a plan view of an alternatively assembly utilizing a Bourdon tube as the pressure sensing element.
Figure 6:
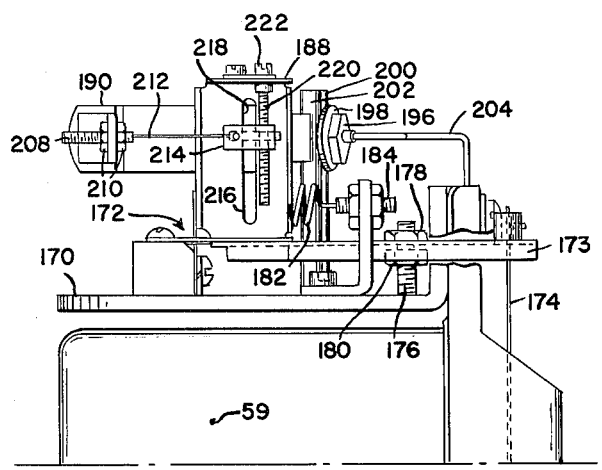
FIGURE 6 is an elevation of what is illustrated in FIGURE 5.

One of the practical advantages of the invention is that major parts of the apparatus may be utilized for the production of transducers capable of handling widely varying pressure ranges. FIGURES 5 and 6 illustrate a substitute upper assembly which may be utilized in the transducer to provide particularly for measurement of relatively high pressures, a Bourdon tube being used for this purpose. A substitutable sub-frame 170 is provided which mounts by means of the cross flexure 172 the lever 173 to the free end of which there is connected the wire link 174 equivalent to, and connected identically with, the wire link 46 previously referred to. The motor 59 is indicated in FIGURE 6. Motion of the lever 173 is limited by the arrangement of the fixed screw 176 which passes through it and carries the stop nuts 178 and 180.

To aid a lighter spring such as 66, previously described, in zero adjustment, and, in effect, to balance the high pressure which may exist at the lower end of a range of operation, there is provided the spring 182 which is connected at one end to a screw 184 passing through a bracket of the frame and adjustable in its longitudinal position by a pair of nuts. The other end of this spring is anchored at 186 to the upstanding portion of the lever 173 above its pivot. The spring 182 may be chosen so as to be suitable for the pressure range which is to be measured.

The lever 173 has an upward extension 188. A Bourdon tube 190 has an end portion 192 carrying a plate 194 and threaded to receive a nut 196 and washer 198 to clamp it in a vertically adjusted position to a pair of upstanding posts 200 and 202 carried by a plate 203 which is adjustably mounted on the frame by the provision of curved slots 205 and 207 which receive clamping screws. The center of the arc of adjustment is concentric with respect to the approximate center of the Bourdon tube 190, so that angular adjustment of the plate 203 will affect the position of the closed outer end of the Bourdon tube. Introduction of fluid under pressure to the Bourdon tube is provided through a flexible connection 204.

The outer closed end of the Bourdon tube is connected to an element 206 through which passes the screw 208 which may be adjustably positioned axially by the nuts 210. The screw 208 anchors one end of a wire link 212, the other end of which is anchored in a block 214 movable vertically along the slot 216 provided in the lever extension 188 and arranged to be clamped in position by a nut 218 threaded on a stud extending from the block 214 through the slot. Fine adjustment of the vertical position of the block is effected by a screw 220 threaded therein and having a head journalled at 222 in the lever extension 188.

Zero adjustment for this modification has already been mentioned. Range adjustment is provided by changing the effective lever arm acted on by the link 212. For the purpose of this adjustment, the nut 196 is freed and also the nut 218 so that the Bourdon tube assembly may be vertically moved by adjustment of screw 220, the block 214 moving along the slot 216, and the anchorage of the Bourdon tube moving along the posts 200 and 202. Following completion of adjustment the nuts may be tightened to maintain it. The Bourdon tube assembly moves parallel to itself so that the link 212 always has the same direction in exerting its force.

The operation of this modification is the same as that previously described with respect to the first modification, the only difference being that the Bourdon tube 190 substitutes for the bellows in applying a force to the link 174 and its connection to the motor and the null detector.

Figure 7:
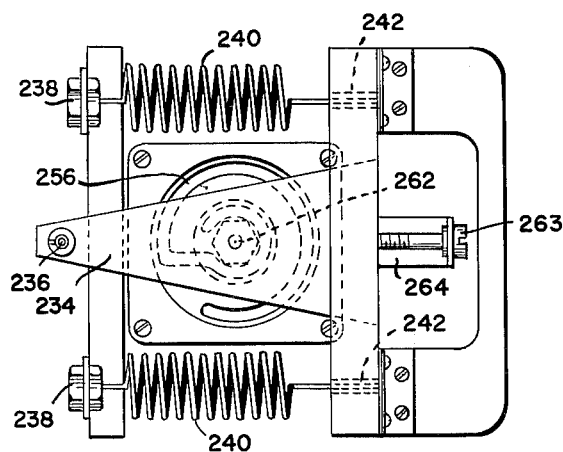
FIGURE 7 is a plan view of still another modification provided in accordance with the invention.
Figure 8:
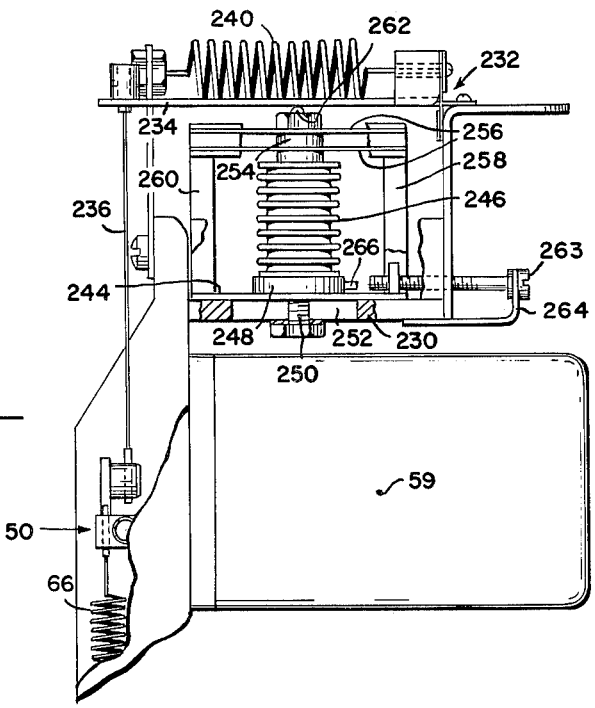
FIGURE 8 is an elevation of what is illustrated in FIGURE 7.

Reference may now be made to the third modification shown in FIGURES 7 and 8, there being illustrated a further top assembly adapted to be used with the standard lower portion of the apparatus. The arrangement shown in FIGURES 7 and 8 is particularly adapted for the measurement of a range of rather large pressures with considerable adjustment of the range and with a balancing or zeroizing spring arrangement to balance out, effectively, pressures below the lower limit of the range.

In this last modification the frame indicated at 230 supports the cross-flexure pivotal mounting 232 of a lever 234 which is connected at its free end to the wire link 236 which is in turn connected in the same fashion as the links 46 and 174, previously described, to the standard lower portion of the apparatus, the motor being again indicated at 59.

Adjustable anchorages are provided at 238 for a pair of springs 240 which are in turn anchored at their other ends at 242 to the portion of the lever 234 above its pivot.

A slidable base 244 has secured to it the lower end 248 of a bellows 246 into which there is threaded the screw 250 passing through a slot 252 in the base 230, the slot extending in a direction perpendicular to the axis of pivoting of the lever 234. The upper end of the bellows 246 is secured at 254 to the central portions of a pair of flexure springs 256 mounted between posts 258 and 260 carried by the slidable base 244. This provides a rugged assembly which insures that the bellows 246 can only move vertically in the direction of its axis. The bellows is provided with a rounded pin at its upper end at 262 bearing on the undersurface of the lever 234. The lever 234 is adjusted in position so that it extends parallel to the direction of movement of the base 244.

The bellows assembly is adjusted horizontally, after freeing of the screw 250, by rotation of the screw 263 threaded into an upstanding ear thereof and mounted for rotation in the bracket 264. Following adjustment the bellows assembly may be locked in position by tightening of the screw 250. The pressure to be measured is applied to the interior of the bellows through a flexible tube 266.

The operation of this modification is essentially as previously described, the only difference being in the particular pressure-sensitive assembly which imparts movement to the link 236. The arrangement is rugged and capable of operating under high pressure conditions.

It will be evident from the above that various changes may be made without departing from the invention as defined in the following claims.

What is claimed is:

1. Apparatus for the conversion of pressures to be measured to electrical signals substantially linearly related to the pressures comprising a pressure-sensitive element having a fixed anchorage of one portion thereof and providing a mechanical movement of a second portion thereof relative to the first portion in response to pressures applied thereto, a lever having a fixed pivot, means providing connection of said second portion of the pressure-sensitive element with said lever, means for adjusting said means providing a connection along said lever in a direction transverse to the axis of the lever, thereby to change the effective lever arm of the connection, a spring having a fixed anchorage and applying a torque to said lever, a current actuated motor, a connection between said motor and said lever through which the motor applies a torque to said lever, said motor being of a type which provides the last mentioned torque as a substantial linear function of the motor actuating current, and means sensitive to slight deviations of said lever from a predetermined position to control the motor actuating current to maintain said lever in substantially said predetermined position, thereby to maintain substantially constant the torque balance on said lever.

2. Apparatus for the conversion of pressures to be measured to electrical signals substantially linearly related to the pressures comprising a pressure-sensitive element having a fixed anchorage of one portion thereof and providing a mechanical movement of a second portion thereof relative to the first portion in response to pressures applied thereto, a lever having a fixed pivot, means providing connection of said second portion of the pressure-sensitive element with said lever, means for adjusting said means providing a connection along said lever in a direction transverse to the axis of the lever, thereby to change the effective lever arm of the connection, a spring having a fixed anchorage and applying a torque to said lever, a current actuated motor, a connection between said motor and said lever through which the motor applies a torque to said lever, said motor being of a type which provides the last mentioned torque as a substantial linear function of the motor actuating current, and means sensitive to slight deviations of said lever from a predetermined position to control the motor actuating current to maintain said lever in substantially said predetermined position, thereby to maintain substantially constant the torque balance on said lever, said means for adjusting said connection effecting bodily movement of the pressure-sensitive element substantially parallel to itself to maintain substantially constant the direction of movement imparted through said connection to said lever.

3. Apparatus for the conversion of pressures to be measured to electrical signals substantially linearly related to the pressures comprising a pressure-sensitive element having a fixed anchorage of one portion thereof and providing a mechanical movement of a second portion thereof relative to the first portion in response to pressures applied thereto, said pressure-sensitive element being in the form of a bellows, a lever having a fixed pivot, means providing connection of said second portion of the pressure-sensitive element with said lever, means for adjusting said means providing a connection along said lever in a direction transverse to the axis of the lever, thereby to change the effective lever arm of the connection, a spring having a fixed anchorage and applying a torque to said lever, a current actuated motor, a connection between said motor and said lever through which the motor applies a torque to said lever, said motor being of a type which provides the last mentioned torque as a substantial linear function of the motor actuating current, and means sensitive to slight deviations of said lever from a predetermined position to control the motor actuating current to maintain said lever in substantially said predetermined position, thereby to maintain substantially constant the torque balance on said lever.

4. Apparatus for the conversion of pressures to be measured to electrical signals substantially linearly related to the pressures comprising a pressure-sensitive element having a fixed anchorage of one portion thereof and providing a mechanical movement of a second portion thereof relative to the first portion in response to pressures applied thereto, said pressure-sensitive element being in the form of a bellows, a lever having a fixed pivot, means providing connection of said second portion of the pressure-sensitive element with said lever, means for adjusting said means providing a connection along said lever in a direction transverse to the axis of the lever, thereby to change the effective lever arm of the connection, a spring having a fixed anchorage and applying a torque to said lever, a current actuated motor, a connection between said motor and said lever through which the motor applies a torque to said lever, said motor being of a type which provides the last mentioned torque as a substantial linear function of the motor actuating current, and means sensitive to slight deviations of said lever from a predetermined position to control the motor actuating current to maintain said lever in substantially said predetermined position, thereby to maintain substantially constant the torque balance on said lever, said means for adjusting said connection effecting bodily movement of the pressure-sensitive element substantially parallel to itself to maintain substantially constant the direction of movement imparted through said connection to said lever.

5. Apparatus for the conversion of pressures to be measured to electrical signals substantially linearly related to the pressures comprising a pressure-sensitive element having a fixed anchorage of one portion thereof and providing a mechanical movement of a second portion thereof relative to the first portion in response to pressures applied thereto, said pressure-sensitive element being in the form of a Bourdon tube, a lever having a fixed pivot, means providing connection of said second portion of the pressure-sensitive element with said lever, means for adjusting said means providing a connection along said lever in a direction transverse to the axis of the lever, thereby to change the effective lever arm of the connection, a spring having a fixed anchorage and applying a torque to said lever, a current actuated motor, a connection between said motor and said lever through which the motor applies a torque to said lever, said motor being of a type which provides the last mentioned torque as a substantial linear function of the motor actuating current, and means sensitive to slight deviations of said lever from a predetermined position to control the motor actuating current to maintain said lever in substantially said predetermined position, thereby to maintain substantially constant the torque balance on said lever.

6. Apparatus for the conversion of pressures to be measured to electrical signals substantially linearly related to the pressures comprising a pressure-sensitive element having a fixed anchorage of one portion thereof and providing a mechanical movement of a second portion thereof relative to the first portion in response to pressures applied thereto, said pressure-sensitive element being in the form of a Bourdon tube, a lever having a fixed pivot, means providing connection of said second portion of the pressure-sensitive element with said lever, means for adjusting said means providing a connection along said lever in a direction transverse to the axis of the lever, thereby to change the effective lever arm of the connection, a spring having a fixed anchorage and applying a torque to said lever, a current actuated motor, a connection between said motor and said lever through which the motor applies a torque to said lever, said motor being of a type which provides the last mentioned torque as a substantial linear function of the motor actuating current, and means sensitive to slight deviations of said lever from a predetermined position to control the motor actuating current to maintain said lever in substantially said predetermined position, thereby to maintain substantially constant the torque balance on said lever, said means for adjusting said connection effecting bodily movement of the pressure-sensitive element substantially parallel to itself to maintain substantially constant the direction of movement imparted through said connection to said lever.

References Cited by the Examiner
UNITED STATES PATENTS 3,061,823 10/1962 Crossley _____ 340—187
3,127,558 3/1964 Garnett _____ 324—34

DAVID SCHONBERG, *Acting Primary Examiner.*

D. O. WOODIEL, *Assistant Examiner.*